United States Patent
Dieffenderfer et al.

(10) Patent No.: US 6,976,132 B2
(45) Date of Patent: Dec. 13, 2005

(54) REDUCING LATENCY OF A SNOOP TENURE

(75) Inventors: James N. Dieffenderfer, Apex, NC (US); Bernard C. Drerup, Austin, TX (US); Jaya P. Ganasan, Youngsville, NC (US); Richard G. Hofmann, Apex, NC (US); Thomas A. Sartorius, Raleigh, NC (US); Thomas P. Speier, Holly Springs, NC (US); Barry J. Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 10/249,304

(22) Filed: Mar. 28, 2003

(65) Prior Publication Data

US 2004/0193809 A1   Sep. 30, 2004

(51) Int. Cl.⁷ .............................................. G06F 12/00
(52) U.S. Cl. ...................................................... 711/146
(58) Field of Search ................................ 711/141, 146

(56) References Cited

U.S. PATENT DOCUMENTS

| | | | |
|---|---|---|---|
| 5,325,503 A | 6/1994 | Stevens et al. | |
| 5,355,467 A | 10/1994 | MacWilliams et al. | |
| 5,446,863 A | 8/1995 | Stevens et al. | |
| 5,524,234 A | 6/1996 | Martinex, Jr. et al. | |
| 5,535,395 A | 7/1996 | Tipley et al. | |
| 5,553,248 A | 9/1996 | Melo et al. | |
| 5,553,310 A | 9/1996 | Taylor et al. | |
| 5,588,131 A | 12/1996 | Borrill | |
| 5,608,878 A | 3/1997 | Arimilli et al. | |
| 5,623,632 A | 4/1997 | Liu et al. | |
| 5,664,150 A | 9/1997 | Isaac et al. | |
| 5,717,894 A | 2/1998 | Vivio | |
| 5,745,698 A | 4/1998 | Allen et al. | |
| 5,893,921 A | 4/1999 | Bucher et al. | |
| 5,940,856 A | 8/1999 | Arimilli et al. | |
| 5,940,864 A | 8/1999 | Arimilli et al. | |
| 5,943,685 A | 8/1999 | Arimilli et al. | |
| 5,946,709 A | 8/1999 | Arimilli et al. | |
| 5,956,746 A | 9/1999 | Wang | |
| 5,963,974 A | 10/1999 | Arimilli et al. | |
| 5,991,855 A | 11/1999 | Jeddeloh et al. | |
| 6,003,106 A * | 12/1999 | Fields et al. ................ | 710/308 |
| 6,018,792 A | 1/2000 | Jeddeloh et al. | |
| 6,052,762 A | 4/2000 | Arimilli et al. | |
| 6,122,709 A | 9/2000 | Wicki et al. | |
| 6,125,450 A | 9/2000 | Kardach | |

(Continued)

Primary Examiner—Christian P. Chace
(74) Attorney, Agent, or Firm—Robert A. Voigt, Jr.; Winstead Sechrest & Minick PC (57) ABSTRACT

A method and system for reducing latency of a snoop tenure. A bus macro may receive a snoopable transfer request. The bus macro may determine which snoop controllers in a system will participate in the snoop transaction. The bus macro may then identify which participating snoop controllers are passive. Passive snoop controllers are snoop controllers associated with cache memories with cache lines only in the shared or invalid states of the MESI protocol. The snoop request may then be completed by the bus macro without waiting to receive responses from the passive participating snoop controllers. By not waiting for responses from passive snoop controllers, the bus macro may be able to complete the snoop request in a shorter amount of time thereby reducing the latency of the snoop tenure and improving performance of the system bus.

20 Claims, 4 Drawing Sheets

U.S. PATENT DOCUMENTS

| | | |
|---|---|---|
| 6,212,602 B1 | 4/2001 | Wicki et al. |
| 6,321,305 B1 | 11/2001 | Arimilli et al. |
| 6,321,307 B1 | 11/2001 | Maguire et al. |
| 6,347,360 B1 | 2/2002 | Moudgal et al. |
| 6,349,367 B1 | 2/2002 | Arimilli et al. |
| 6,389,517 B1 | 5/2002 | Moudgal et al. |
| 6,405,322 B1 | 6/2002 | Gaither et al. |
| 6,516,379 B1 | 2/2003 | Deshpande et al. |
| 2002/0087804 A1* | 7/2002 | Khare et al. ............ 711/141 |
| 2004/0068595 A1* | 4/2004 | Dieffenderfer et al. ..... 710/105 |

* cited by examiner

REDUCING LATENCY OF A SNOOP TENURE

BACKGROUND OF THE INVENTION

The present invention relates to the field of cache snooping in a multiprocessor environment, and more particularly to reducing the latency of a snoop tenure.

A multiprocessor system may comprise multiple processors coupled to a common shared system memory. Each processor may comprise one or more levels of cache memory. The multiprocessor system may further comprise a system bus coupling the processing elements to each other and to the system memory. A cache memory may refer to a relatively small, high-speed memory that contains a copy of information from one or more portions of the system memory. Frequently, the cache memory is physically distinct from the system memory. Such a cache memory may be integral with a processor in the system, commonly referred to as a Level-1 (L1), or primary, cache, or may be non-integral with a processor in the system, commonly referred to as a Level 2 (L2), or secondary, cache.

When a processor generates a read request and the requested data resides in its cache memory, e.g., L1 cache, then a cache read hit takes place. The processor may then obtain the data from the cache memory without having to access the system memory. If the data is not in the cache memory, then a cache read miss occurs. The memory request may be forwarded to the system memory and the data may subsequently be retrieved from the system memory as would normally be done if the cache did not exist. On a cache miss, the data that is retrieved from the system memory may be provided to the processor and may also be written into the cache memory due to the statistical likelihood that this data will be requested again by that processor. Likewise, if a processor generates a write request, the write data may be written to the cache memory without having to access the system memory over the system bus.

Hence, data may be stored in multiple locations, e.g., L1 cache of a particular processor and system memory. If a processor altered the contents of a system memory location that is duplicated in its cache memory, the cache memory may be said to hold "modified" data. The system memory may be said to hold "stale" or invalid data. Problems may result if another processor or bus agent, e.g., Direct Memory Access (DMA) controller, inadvertently obtained this "stale" or invalid data from system memory. Subsequently, it is required that processors or other bus agents are provided the most recent copy of data from either the system memory or cache memory where the data resides. This may commonly be referred to as "maintaining cache coherency." In order to maintain cache coherency, therefore, it may be necessary to monitor the system bus when the processor or other bus agent does not control the bus to see if another processor or bus agent accesses cacheable system memory. This method of monitoring the system bus is referred to in the art as "snooping."

Each cache may be associated with logic circuitry commonly referred to as a "snoop controller" configured to monitor the system bus for the snoopable addresses requested by a processor or other bus agent. Snoopable addresses may refer to the addresses requested by the processor or bus agent that are to be snooped by snoop controllers on the system bus. Snoop controllers may snoop these snoopable addresses to determine if copies of the snoopable addresses requested by the processor or bus agent are within their associated cache memories using a protocol commonly referred to as Modified, Exclusive, Shared and Invalid (MESI). In the MESI protocol, an indication of a coherency state is stored in association with each unit of storage in the cache memory. This unit of storage may commonly be referred to as a "coherency granule." A "cache line" may be the size of a coherency granule. In the MESI protocol, the indication of the coherency state for each coherency granule in the cache memory may be stored in a cache state directory in the cache subsystem. Each coherency granule may have one of four coherency states: modified (M), exclusive (E), shared (S), or invalid (I), which may be indicated by two or more bits in the cache state directory. The modified state indicates that a coherency granule is valid only in the cache memory containing the modified or updated coherency granule and that the value of the updated coherency granule has not been written to system memory. When a coherency granule is indicated as exclusive, the coherency granule is resident in only the cache memory having the coherency granule in the exclusive state. However, the data in the exclusive state is consistent with system memory. If a coherency granule is marked as shared, the coherency granule is resident in the associated cache memory and may be in one or more cache memories in addition to the system memory. If the coherency granule is marked as shared, all of the copies of the coherency granule in all the cache memories so marked are consistent with the system memory. Finally, the invalid state may indicate that the data and the address tag associated with the coherency granule are both invalid and thus are not contained within that cache memory.

A processor or other bus agent may generate a "transfer request" to be received by a unit commonly referred to as a "bus macro". A "transfer request" may refer to either a request to read an address not within the processor's or bus agent's associated cache memory(ies), a request to write to an address not exclusively owned by the processor's or bus agent's associated cache memory(ies), synchronization commands, address only requests, e.g., updating the state of a coherency granule, or translation lookaside buffer invalidation requests. The bus macro may be configured to determine if the received transfer request is snoopable. That is, the bus macro may be configured to determine if the received transfer request is to be broadcasted to the other snoop controllers not associated with the requesting processor or bus agent in order to determine if a copy of the requested snoopable address, i.e., a copy of the requested coherency granule, is within their associated cache memories. The broadcasted transfer request may commonly be referred to as a "snoop request."

Based on the resulting responses from each of the snoop controllers, the bus macro may decide the proper action to take on the snoop request. For example, if the snoop request was a request to read from an address with an intent-to-modify and a response to the snoop request was a "hit" to the modified line, i.e., a snoop controller may have detected that the state of the requested coherency granule was in the modified state, then the bus macro may wait for the responding snoop controller to write-out (referred to as "castout" or "push") the line before reading the requested information from system memory. If, however, each response to the snoop request was a "hit" to a shared line or the line is invalidated, then the bus macro may be free to read the requested information from system memory.

The snoop request may be said to be completed upon the bus macro receiving a signal indicating completion of the snoop operation from each of the snoop controllers thereby being able to complete the transaction. That is, upon receiving the signal indicating completion of the snoop operation from each of the snoop controllers, the bus macro may be able to service the processor's or other bus agent's transfer request, e.g., read from or write to system memory. The duration of time from broadcasting the snoop request until completing the snoop request may be referred to as a "snoop tenure".

Since the bus macro must wait until each snoop controller snoops its associated cache contents and responds prior to servicing the processor's or bus agent's transfer request, there is a latency associated with servicing the processor's or bus agent's transfer request. By reducing the latency of the snoop tenure, i.e., by reducing the latency associated with servicing the processor's or bus agent's transfer request, bus performance may be improved.

Therefore, there is a need in the art to reduce the latency of snoop tenures thereby improving bus performance.

SUMMARY OF THE INVENTION

The problems outlined above may at least in part be solved in some embodiments by a bus macro completing the snoop request without waiting to receive responses from passive snoop controllers. A passive snoop controller may refer to snoop controllers associated with cache memories that have cache lines only in the shared or invalid states of the MESI protocol. By having cache lines in the shared or invalid states of the MESI protocol, a cast-out of modified data will not be required. By not waiting for responses from passive snoop controllers, the bus macro may be able to complete the snoop request in a shorter amount of time thereby reducing the latency of the snoop tenure and improving performance of the system bus.

In one embodiment of the present invention, a method for reducing latency of a snoop tenure may comprise the step of receiving a snoopable transfer request. The method may further comprise determining which snoop controllers in a system will participate in a snoop transaction. The method may further comprise identifying which participating snoop controllers are passive where the passive snoop controllers are snoop controllers associated with cache memories with cache lines only in the shared or invalid states of the MESI protocol. The method may further comprise completing the snoop request without waiting to receive responses from passive participating snoop controllers.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF DRAWINGS

A better understanding of the present invention can be obtained when the following detailed description is considered in conjunction with the following drawings, in which.

DETAILED DESCRIPTION

The present invention comprises a method and system for reducing latency of a snoop tenure. In one embodiment of the present invention, a bus macro may receive a snoopable transfer request where a snoopable transfer request may be a request with attributes required to be snooped. The bus macro may then determine which snoop controllers in the system will participate in the snoop transaction. The bus macro may then identify which of those participating snoop controllers are passive. Passive snoop controllers are snoop controllers associated with cache memories with cache lines only in the shared or invalid states of the MESI protocol. Non-passive snoop controllers are snoop controllers associated with cache memories with cache lines in the modified, exclusive, shared or invalid states of the MESI protocol. The snoop request may then be completed without the bus macro waiting to receive responses from the passive participating snoop controllers. By not waiting for responses from passive snoop controllers, the bus macro may be able to complete the snoop request in a shorter amount of time thereby reducing the latency of the snoop tenure and improving performance of the system bus.

Although the present invention is described with reference to reducing the latency of a snoop tenure in connection with the MESI protocol, it is noted that the principles of the present invention may be applied to other cache protocols, e.g., Modified, Owned, Exclusive, Shared, Invalid (MOESI) protocol, or Modified, Exclusive, Recent, Shared, Invalid (MERSI) protocol. It is further noted that a person of ordinary skill in the art would be capable of applying the principles of the present invention as discussed herein to other cache protocols. It is further noted that embodiments applying the principles of the present invention to other cache protocols would fall within the scope of the present invention.

In the following description, numerous specific details are set forth such as specific protocols to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been admitted inasmuch as such details are not necessary to obtain a complete understanding of the present invention and are within the skills of persons of ordinary skill in the relevant art.

Figure 1:
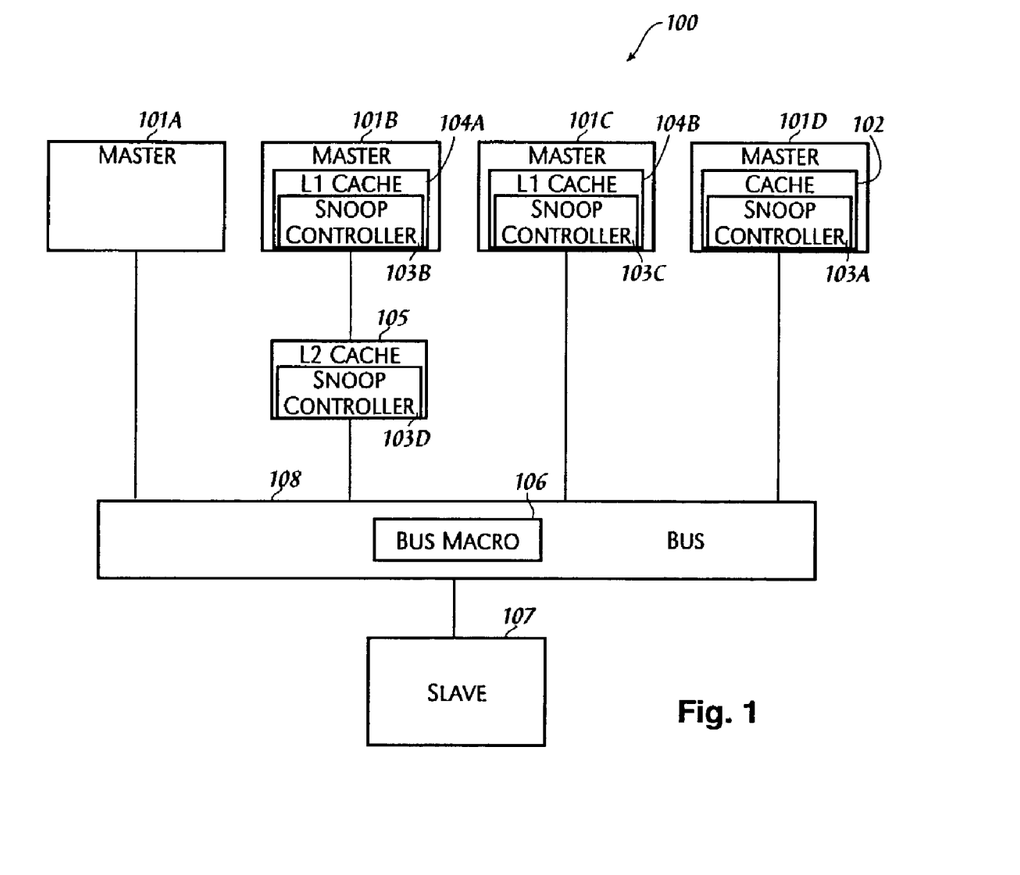
FIG. 1 illustrates a system configured in accordance with an embodiment of the present invention.

FIG. 1—System

FIG. 1 illustrates an embodiment of a system 100 in accordance with the present invention. System 100 may comprise one or more masters 101A–D, e.g., processors, Direct Memory Access (DMA) controllers. Masters 101A–D may collectively or individually be referred to as masters 101 or master 101, respectively. Master 101D may be a DMA controller configured to control blocks of information to be exchanged between a slave 107, e.g., memory unit, and external Input/Output (I/O) devices (not shown). In order to ensure that data stored in its local cache memory 102 is not invalidated, master 101D may include snoop controller 103A configured to monitor a system bus 108 for snoopable addresses requested by masters 101A–C as discussed in greater detail further below in conjunction with FIGS. 2–4. If anyone of masters 101A–C issued a request to read data with intent to modify, and data at the requested address was stored in cache memory 102 of master 101D, then master 101D (DMA controller) would have to invalidate the data stored at the requested address. Since master 101D (DMA controller) does not modify any data in its cache 102, cache 102 may have cache lines only in the shared or invalid states of the MESI protocol. Masters 101B–C may each comprise a level one (L1) cache 104A–B, e.g., L1 instruction/data cache, respectively. L1 caches 104A–B may be configured to store instruction and data values that may be repeatedly accessed by masters 101B–C, respectively. L1 caches 104A–B may collectively or individually be referred to as L1 caches 104 or L1 cache 104, respectively. It is noted that those skilled in the art will recognize that multiple L1 caches, e.g., L1 instruction cache, L1 data cache, may be implemented instead of a unified L1 cache. It is further noted that masters 101A–C may each comprise an L1 cache 104. It is further noted that L1 caches 104A–B may include snoop controllers 103B–C, respectively, configured to monitor system bus 108 for snoopable addresses requested by masters 101 as discussed in greater detail further below in conjunction with FIGS. 2–4. Snoop controllers 103B–C may be configured similarly to snoop controller 103A. It is further noted that system 100 may comprise any number of masters 101 and that FIG. 1 is illustrative.

In order to minimize data access latency, one or more additional levels of cache memory coupled to master 101, e.g., master 101B, may be implemented such as a level two (L2) cache 105 coupled to master 101B. The lower cache levels, e.g., L2 cache 105, may be employed to stage data to an L1 cache, e.g., L1 cache 104A, and typically have progressively larger storage capacities but longer access latencies. As stated above, L1 cache 104 may store instruction and data values that may be repeatedly accessed by master 101. If L1 cache 104, e.g., L1 cache 104A, does not store the information requested by master 101, e.g., master 101B, L1 cache 104 may issue a request to the next lower level of cache, L2 cache 105, to retrieve the requested information. If the requested information is not stored in the next lower level of cache, L2 cache 105, and there are no more lower levels of cache, a snoop controller 103D, associated with the next lower level of cache, L2 cache 105, may be configured to forward master's 101, e.g., master 101 B, request to system bus 108. That is, snoop controller 103D may be configured to monitor higher levels of cache, e.g., L1 cache 104A, for snoopable addresses. Snoop controller 103D may further be configured to monitor system bus 108 for snoopable addresses requested by masters 101 as discussed in greater detail further below in conjunction with FIGS. 2–4. Snoop controller 103D may be configured similarly as snoop controller 103A. Snoop controllers 103A–D may collectively or individually be referred to as snoop controllers 103 or snoop controller 103, respectively. It is noted that masters 101A–C may each be coupled to any number of additional levels of caches. It is further noted that each level of cache may comprise snoop controller 103 configured to monitor system bus 108 or the higher levels of cache for snoopable addresses requested by masters 101, e.g., master 101B.

Figure 2:
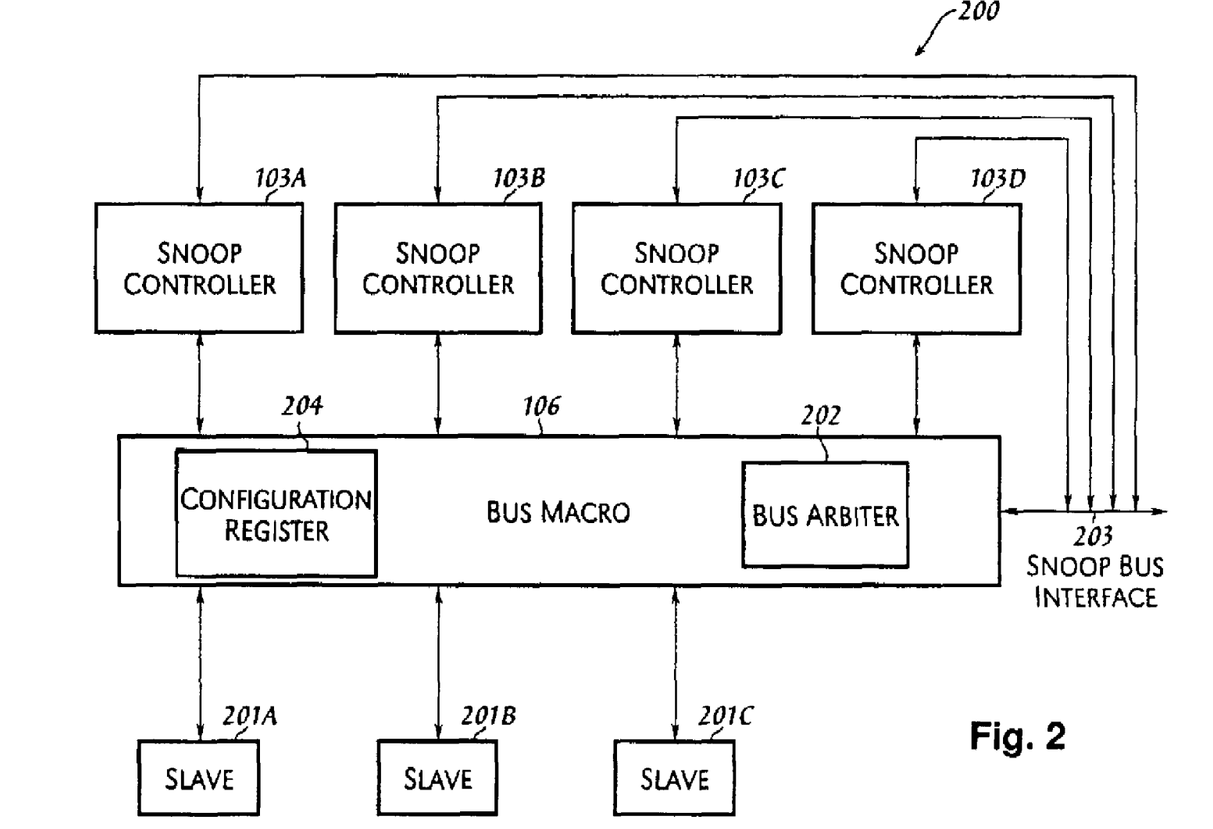
FIG. 2 illustrates a mechanism in the system configured in accordance with an embodiment of the present invention.

Referring to FIG. 1, each master 101 may be coupled to a bus macro 106. System 100 may further comprise a slave 107, e.g., memory, coupled to bus macro 106. Bus macro 106 may subsequently permit the transfer of information, e.g., addresses, data, between masters 101 and slave 107. It is noted that system 100 may comprise any number of slaves 107 coupled to bus macro 106 as illustrated in FIG. 2.

Referring to FIG. 1, master 101 may generate a "transfer request" to be received by bus macro 106. A "transfer request" may refer to either a request to read an address not within its associated cache memory(ies), a request to write to an address not exclusively owned by its associated cache memory(ies), synchronization commands, address only requests, e.g., updating the state of a coherency granule, or translation lookaside buffer invalidation requests. Bus macro 106 may be configured to determine if the received transfer request is snoopable ("snoopable transfer request"). That is, bus macro 106 may be configured to determine if the received transfer request is to be broadcast to the other snoop controllers 103 not associated with master 101 that generated the transfer request. The other snoop controllers 103 may be configured to determine if a copy of the requested snoopable address, i.e., a copy of the requested coherency granule(s), is within their associated cache memories 102, 104, 105. The broadcasted transfer request may commonly be referred to as a "snoop request."

As stated in the Background of the Invention section, the snoop request may be said to be completed upon a bus macro receiving a signal indicating completion of the snoop operation from each of the snoop controllers thereby being able to complete the transaction. That is, upon receiving the signal indicating completion of the snoop operation from each of the snoop controllers, the bus macro may be able to service the processor's or other bus agent's request to read from or write to system memory. The duration of time from broadcasting the snoop request until completing the snoop request may be referred to as a "snoop tenure". Since the bus macro must wait until each snoop controller snoops its associated cache contents prior to servicing the processor's or other bus agent's request, there is a latency associated with servicing the processor's or bus agent's request. By reducing the latency of the snoop tenure, i.e., by reducing the latency associated with servicing the processor's or bus agent's request, bus performance may be improved. Therefore, there is a need in the art to reduce the latency of snoop tenures thereby improving bus performance.

Figure 3:
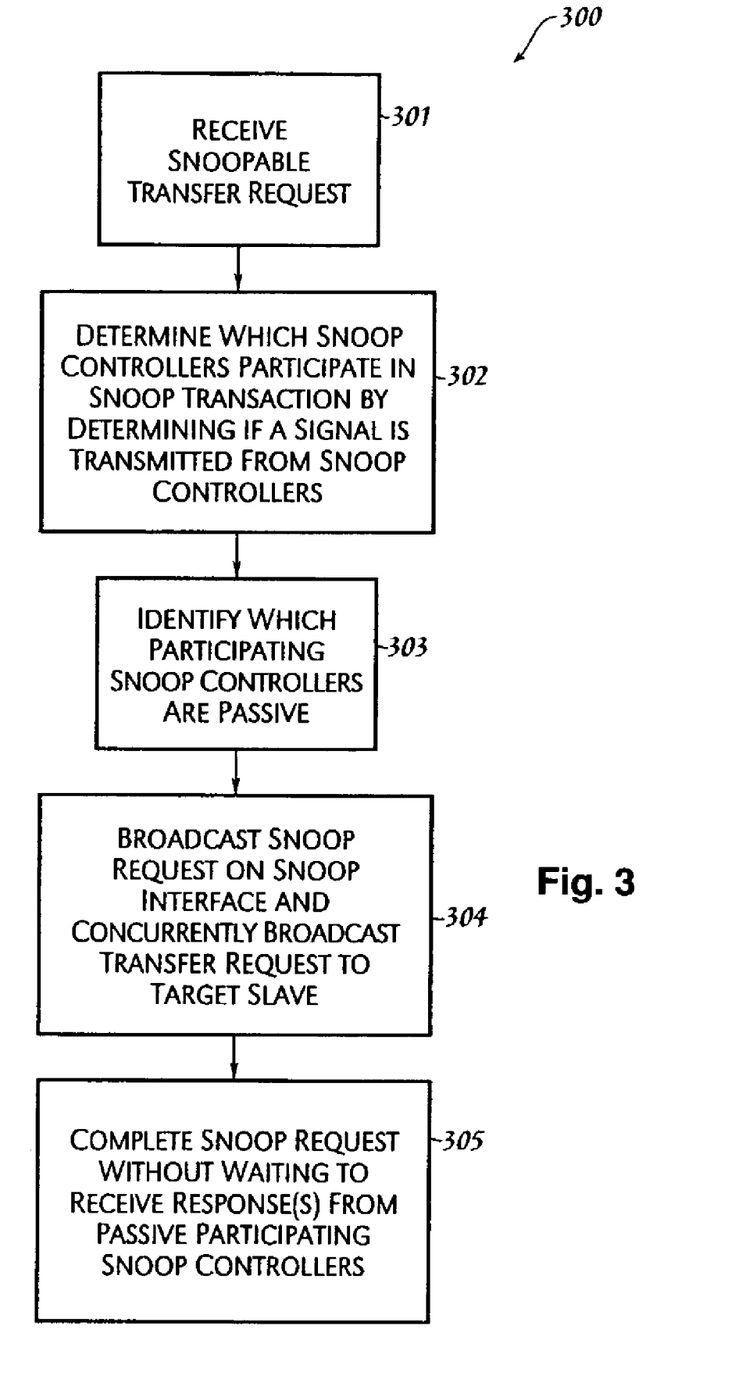
FIG. 3 is a flowchart of a method for reducing latency of a snoop tenure in accordance with an embodiment of the present invention.
Figure 4:
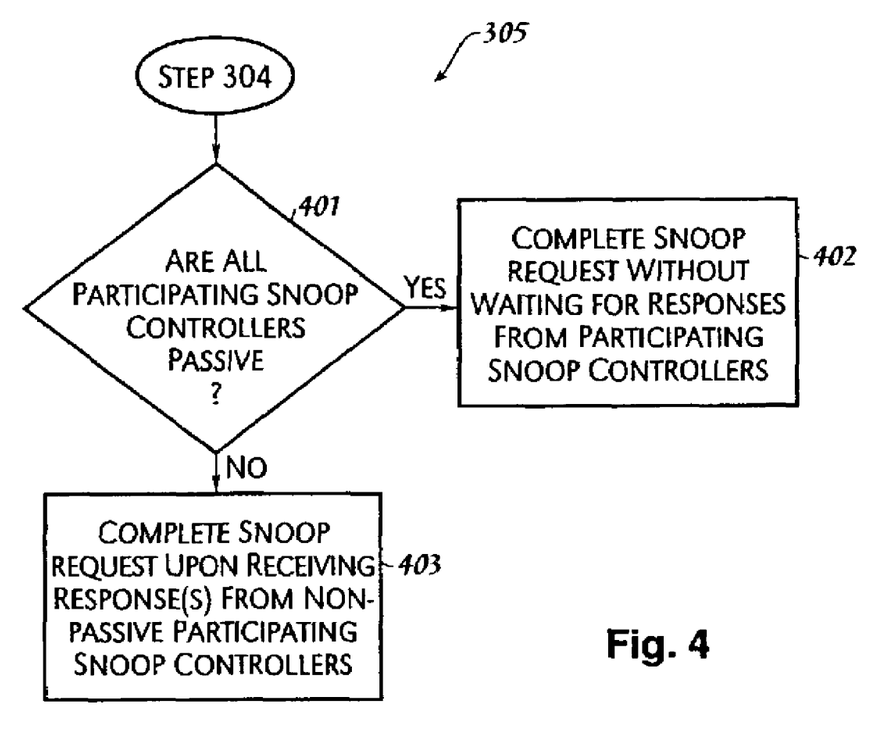
FIG. 4 is a flowchart of the sub-steps of the step of completing the snoop request without waiting to receive responses from passive participating snoop controllers in accordance with an embodiment of the present invention.

Latency in snoop tenures may be reduced thereby improving bus performance by implementing snoop controllers referred to herein as "passive snoop controllers." Passive snoop controllers are snoop controllers associated with cache memories, e.g., cache memory 102, with cache lines only in the shared or invalid states of the MESI protocol. For example, snoop controller 103A associated with cache memory 102 may be a passive snoop controller as cache memory 102 has cache lines only in the shared or invalid states of the MESI protocol. Cache memory 102 may have cache lines only in the shared or invalid states of the MESI protocol as master 101D does not modify any data in its cache memory 102. The term "non-passive snoop controllers" as used herein refers to snoop controllers associated with cache memories, e.g., L1 cache 104, L2 cache 105, with cache lines possibly in any one of the modified, exclusive, shared or invalid states of the MESI protocol. A detailed description of reducing latency in snoop requests by implementing passive snoop controllers is provided below in conjunction with FIGS. 2–4. FIG. 2 illustrates a more detailed illustration of a mechanism in system 100 configured to reduce the latency of a snoop tenure by implementing passive snoop controllers. FIGS. 3–4 are flowcharts of a method for reducing latency of a snoop tenure thereby improving performance of the system bus by implementing passive snoop controllers.

FIG. 2—Mechanism for Reducing Latency in Snoop Tenures

FIG. 2 illustrates an embodiment of the present invention of a mechanism 200 in system 100 for reducing latency in snoop tenures. Mechanism 200 may comprise a bus macro 106 (FIG. 1). Bus macro 106 may be configured to interconnect one or more snoop controllers 103A–D (FIG. 1) with one or more slaves 201A–C, e.g., memories. Slaves 201A–C may collectively or individually be referred to as slaves 201 or slave 201, respectively. Slave 201 may be configured similarly to slave 107 (FIG. 1). Bus macro 106 may comprise a bus arbiter 202 configured to recognize an incoming request from master 101 or snoop controller 103, e.g., snoop controller 103D, as snoopable. Bus macro 106 may further be configured to broadcast the snoop request to the other snoop controllers 103 not associated with the requesting master 110 via snoop bus interface 203 while concurrently broadcasting the snoop request to the targeted slave 201 (targeted slave 201 refers to the slave 201 that master 101 requests to read from or write to). Snoop bus interface 203 may be configured to interface snoop busses (shared snoop bus) between snoop controllers 103 in system 100 and bus macro 106. Bus macro 106 may further comprise a configuration register 204 configured to store information regarding whether a particular snoop controller 103 in system 100 (FIG. 1) is a passive or non-passive snoop controller. In one embodiment, configuration register 204 may comprise a plurality of bits where each bit may be associated with a particular snoop controller 103 indicating if the particular snoop controller 103 is passive or non-passive. In one embodiment, the association of each bit with a particular snoop controller 103 as well as setting a value in that bit to indicate whether the associated snoop controller 103 is passive or non-passive may be pre-programmed. It is noted that mechanism 200 may comprise any number of snoop controllers 103 and slaves 201 and that FIG. 2 is illustrative.

Referring to FIG. 2, in conjunction with FIG. 1, bus macro 106 may receive a transfer request from master 101 or snoop controller 103, e.g., snoop controller 103D. Bus arbiter 202 may determine if the received transfer request is snoopable ("snoopable transfer request") by reading the encoded transfer attributes in the transfer request. Upon bus arbiter 202 detecting the received request to be a snoopable transfer request, bus macro 106 may be configured to determine which snoop controllers 103 may participate in the snoop transaction. That is, upon bus arbiter 202 detecting the received request to be snoopable, bus macro 106 may be configured to determine which snoop controllers 103 are online. In one embodiment, bus macro 106 may be configured to determine which snoop controllers 103 are online by detecting a signal transmitted by snoop controllers 103 when snoop controllers 103 are online.

After determining which snoop controllers 103 will participate in the snoop transaction, bus macro 106 may be configured to identify which participating snoop controllers 103 are passive. As stated above, configuration register 204 may be configured to store information regarding whether snoop controllers 103 in system 100 are passive or non-passive. In one embodiment, bus macro 106 may be configured to read configuration register 204 to determine which participating snoop controllers 103 are passive. As stated above, configuration register 204 may comprise a plurality of bits where each bit may be associated with a particular snoop controller 103. Based on the value of the bit, e.g., 0 or 1, bus macro 106 may determine if the particular snoop controller 103 is passive or non-passive. In another embodiment, bus macro 106 may be configured to identify which participating snoop controllers 103 are passive by detecting a signal, e.g., a signal transmitted by passive snoop controllers or other means that indicate they are passive.

Upon bus arbiter 202 detecting the received request to be snoopable, bus macro 106 may broadcast the snoop request to the other snoop controllers 103 not associated with the requesting master 101 over snoop bus interface 203. Concurrently, bus macro 106 may broadcast the transfer request, i.e., the read or write request, to the targeted slave 201. The snoop request may be broadcasted to both passive and non-passive snoop controllers 103 in order for snoop controllers 103 to determine if any valid data is stored in their associated cache memories 102, 104, 105. In one embodiment, bus macro 106 may be configured to pipeline multiple snoop requests to the other snoop controllers 103 as well as concurrently broadcast transfer requests, i.e., read or write requests, to various targeted slaves 201.

Bus macro 106 may complete the snoop request, i.e., bus macro 106 may read from or write to the targeted slave 201 based on the snoop request, without waiting to receive responses from passive participating snoop controllers, e.g., passive snoop controller 103A, because the associated cache memories for passive snoop controllers have cache lines only in the shared or invalid states of the MESI protocol. By not waiting to receive responses from passive participating snoop controllers, bus macro 106 may be able to complete the snoop request in a shorter amount of time thereby reducing the latency of the snoop tenure and improving performance of system bus 108 (FIG. 1). In one embodiment, bus macro 106 may be configured to pipeline multiple snoop requests thereby being able to complete multiple snoop requests in a shorter amount of time as described above.

Bus macro 106 does not wait to receive a response from the passive snoop controllers, e.g., snoop controller 103A, since the associated cache memories for passive snoop controllers have cache lines only in the shared or invalid states of the MESI protocol. As stated in the Background Information section, if a coherency granule is marked as shared, then all of the copies of the coherency granule in all the cache memories so marked are consistent with the system memory. If a coherency granule is marked as invalid, then the data and the address tag associated with the coherency granule are both invalid and thus are not contained within that cache memory. Hence, in either case, the data in the cache memory, e.g., cache memory 102, associated with passive snoop controllers, e.g., snoop controller 103A, will not be modified and bus macro 106 is free to read from or write to the targeted slave 201.

If all of the participating snoop controllers 103 are passive, then bus macro 106 may complete the snoop request as if it were a non-snoop request. That is, bus macro 106 may read from or write to the targeted slave 201 to complete the snoop request without waiting for any of the responses from the other participating snoop controllers 103. Hence, the latency of the snoop tenure may be the same as a non-snoopable transfer.

If, however, some of the participating snoop controllers 103 are non-passive, then bus macro 106 may complete the snoop request upon receiving response(s) from only those snoop controllers 103 that are non-passive.

FIG. 3—Method for Reducing Latency of a Snoop Request

FIG. 3 is a flowchart of one embodiment of the present invention of a method 300 for reducing latency of a snoop request thereby improving bus performance.

Referring to FIG. 3, in conjunction with FIGS. 1–2, in step 301, bus macro 106 may receive a snoopable transfer request from master 101 or snoop controller 103, e.g., snoop controller 103D. As stated above, bus macro 106 may receive a transfer request from a master 101 or snoop controller 103, e.g., snoop controller 103D. Bus arbiter 202 in bus macro 106 may determine if the received transfer request is snoopable by reading the encoded transfer attributes in the transfer request. In step 301, bus arbiter 202 detects the received transfer request to be snoopable. That is, in step 301, bus arbiter 202 may determine the received transfer request to be a request with attributes required to be snooped.

In step 302, bus macro 106 may determine which snoop controllers 103 are online thereby being able to determine if a copy of the requested snoopable address is within their associated cache memories, e.g., cache memories 102, 104, 105. In one embodiment, bus macro 106 may be configured to determine which snoop controllers 103 are online by detecting a signal transmitted by snoop controllers 103 when snoop controllers 103 are online.

In step 303, bus macro 106 may identify which participating snoop controllers 103 are passive. In one embodiment, bus macro 106 may be configured to read configuration register 204 to determine which participating snoop controllers 103 are passive. As stated above, configuration register 204 may comprise a plurality of bits where each bit may be associated with a particular snoop controller 103. Based on the value of the bit, e.g., 0 or 1, bus macro 106 may determine if the particular snoop controller 103 is passive or non-passive. In another embodiment, bus macro 106 may be configured to identify which participating snoop controllers 103 are passive by detecting a signal, e.g., a signal transmitted by passive snoop controllers or other means that indicate they are passive.

In step 304, upon bus arbiter 202 in bus macro 106 detecting the received request to be snoopable, bus macro 106 may broadcast the snoop request to the other snoop controllers 103 not associated with the requesting master 101 over snoop bus interface 203 as well as concurrently broadcasting the transfer request, i.e., read or write request, to the targeted slave 201. The snoop request may be broadcasted to both passive and non-passive snoop controllers 103 in order for snoop controllers 103 to determine if any valid data is stored in their associated cache memories 102, 104, 105.

In step 305, bus macro 106 may complete the snoop request, i.e., bus macro 106 may read from or write to the targeted slave 201 based on the snoop request, without waiting to receive responses from passive participating snoop controllers 103. By not waiting to receive responses from passive participating snoop controllers 103, bus macro 106 may be able to complete the snoop request in a shorter amount of time thereby reducing the latency of the snoop tenure and improving performance of the system bus. Step 305 may comprise sub-steps as illustrated in FIG. 4.

Referring to FIG. 4, a determination may be made in step 401 as to whether all of the participating snoop controllers 103 are passive. If all of the participating snoop controllers 103 are passive, then, in step 402, bus macro 106 completes the snoop request without waiting for responses from the participating snoop controllers 103. That is, bus macro 106 may read from or write to the targeted slave 201 to complete the snoop request without waiting for any of the responses from the participating snoop controllers 103. By completing the snoop request without waiting for responses from the participating snoop controllers 103, bus macro 106 completes the snoop request as if it were a non-snoop request. Hence, the latency of the snoop tenure may be the same as a non-snoopable transfer.

If, however, some of the participating snoop controllers 103 are non-passive, then, in step 403, bus macro 106 may complete the snoop request upon receiving response(s) from only those snoop controllers 103 that are non-passive. By only waiting to receive responses from non-passive participating snoop controllers 103, bus macro 106 may be able to complete the snoop request in a shorter amount of time thereby reducing the latency of the snoop tenure and improving performance of the system bus.

It is noted that method 300 may be executed in a different order presented and that the order presented in the discussion of FIGS. 3–4 is illustrative. For example, step 304 may be executed prior to executing either step 302 and/or step 303. It is further noted that certain steps in method 300 may be executed in a substantially simultaneous manner. For example, step 304 may be executed in a substantially simultaneous manner with step 302 and/or step 303.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for reducing latency of a snoop tenure comprising the steps of:
   receiving a snoopable transfer request;
   determining which snoop controllers in a system will participate in a snoop transaction;
   identifying which participating snoop controllers are passive, wherein said passive snoop controllers are snoop controllers associated with cache memories with cache lines, only in shared or invalid states of a modified (M), exclusive (E), shared (S), or invalid (I) (MESI) protocol; and
   completing a snoop request without waiting to receive responses from participating passive snoop controllers.

2. The method as recited in claim 1, wherein said step of completing said snoop request comprises the step of:
   completing said snoop request upon receiving responses to said snoop request from participating non-passive snoop controllers, wherein said non-passive snoop controllers are snoop controllers associated with cache memories with cache lines in modified, exclusive, shared or invalid states of said MESI protocol.

3. The method as recited in claim 1, wherein said step of completing said snoop request comprises the step of:
   completing said snoop request without waiting to receive responses from participating snoop controllers if all of said participating snoop controllers are passive.

4. The method as recited in claim 1, wherein said completing said snoop request comprises the step of:
   reading from or writing to a targeted slave.

5. The method as recited in claim 4, wherein said targeted slave is a memory unit.

6. The method as recited in claim 1 further comprising the step of:
   broadcasting said snoop request on a snoop interface; and
   broadcasting said transfer request to a targeted slave.

7. The method as recited in claim 1, wherein said step of determining which snoop controllers in said system will participate in said snoop transaction comprises the step of:
   determining if a signal is transmitted by said snoop controllers in said system.

8. The method as recited in claim 1, wherein said step of identifying which participating snoop controllers are passive comprises the step of:
   reading a configuration register.

9. The method as recited in claim 8, wherein said configuration register comprises a plurality of bits, wherein each of said plurality of bits is associated with a particular snoop controller indicating if said particular snoop controller is passive.

10. The method as recited in claim 1, wherein said step of identifying which participating snoop controllers are passive comprises the step of:
    detecting a signal.

11. A system, comprising:
    a plurality of masters configured to access a block of data, wherein a plurality of said plurality of masters has a cache memory associated with it, wherein each of said plurality of cache memories is associated with a snoop controller;
    one or more slaves configured to store blocks of data; and
    a bus coupling said plurality of masters to said one or more slaves, wherein said bus comprises:
    circuitry operable for receiving a snoopable transfer request;
    circuitry operable for determining which of said plurality of snoop controllers will participate in a snoop transaction;
    circuitry operable for identifying which participating snoop controllers are passive, wherein said passive snoop controllers are snoop controllers associated with cache memories with cache lines only in shared or invalid states of a modified (M), exclusive (E), shared (S), or invalid (I) (MESI) protocol; and
    circuitry operable for completing a snoop request without waiting to receive responses from participating passive snoop controllers.

12. The system as recited in claim 11, wherein said circuitry operable for completing said snoop request comprises:
    circuitry operable for completing said snoop request upon receiving responses to said snoop request from participating non-passive snoop controllers, wherein said non-passive snoop controllers are snoop controllers associated with cache memories with cache lines in modified, exclusive, shared or invalid states of said MESI protocol.

13. The system as recited in claim 11, wherein said circuitry operable for completing said snoop request comprises:
    circuitry operable for completing said snoop request without waiting to receive responses from participating snoop controllers if all of said participating snoop controllers are passive.

14. The system as recited in claim 11, wherein said circuitry operable for completing said snoop request comprises:
    circuitry operable for reading from or writing to one of said one or more slaves.

15. The system as recited in claim 14, wherein said one of said one or more slaves is a memory unit.

16. The system as recited in claim 11, wherein said bus further comprises:
    circuitry operable for broadcasting said snoop request on a snoop interface; and
    circuitry operable for broadcasting said transfer request to one of said one or more slaves.

17. The system as recited in claim 11, wherein said circuitry operable for determining which snoop controllers in said system will participate in said snoop transaction comprises:
    circuitry operable for determining if a signal is transmitted by said snoop controllers in said system.

18. The system as recited in claim 11, wherein said circuitry operable for identifying which participating snoop controllers are passive comprises:
    circuitry operable for reading a configuration register.

19. The system as recited in claim 18, wherein said configuration register comprises a plurality of bits, wherein each of said plurality of bits is associated with a particular snoop controller indicating if said particular snoop controller is passive.

20. The system as recited in claim 11, wherein said circuitry operable for identifying which participating snoop controllers are passive comprises:
    circuitry operable for detecting a signal.

* * * * *